US007362882B2

(12) United States Patent
Eisenmann et al.

(10) Patent No.: US 7,362,882 B2

(45) Date of Patent: Apr. 22, 2008

(54) METHOD AND DEVICE FOR COMPENSATING FOR SHADOWS IN DIGITAL IMAGES

(75) Inventors: Lutz Eisenmann, Vierkirchen (DE); Carsten Koch, Dahlenburg (DE); Jason Jeong-Suk Yoon, Seoul (KR)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 176 days.

(21) Appl. No.: 11/119,476

(22) Filed: May 2, 2005

(65) Prior Publication Data

US 2005/0236555 A1 Oct. 27, 2005

Related U.S. Application Data

(63) Continuation of application No. PCT/EP03/10224, filed on Sep. 12, 2003.

(30) Foreign Application Priority Data

Oct. 31, 2002 (DE) ................................ 102 50 705

(51) Int. Cl.
*G06K 9/00* (2006.01)

(52) U.S. Cl. ......................... 382/103; 382/272; 701/45

(58) Field of Classification Search ................ 382/103, 382/104, 106, 107, 172, 181, 194, 232, 256, 382/274, 305, 318, 169, 203, 276, 255, 105, 382/173, 199, 216; 356/613, 4.1; 701/45; 250/208.1

See application file for complete search history.

(56) References Cited

U.S. PATENT DOCUMENTS 5,986,763 A * 11/1999 Inoue ......................... 356/613
6,323,477 B1 * 11/2001 Blasing et al. ........... 250/208.1
6,324,453 B1 * 11/2001 Breed et al. .................. 701/45
6,766,036 B1 * 7/2004 Pryor ......................... 382/103
6,829,370 B1 * 12/2004 Pavlidis et al. ............. 382/103
6,947,577 B2 * 9/2005 Stam et al. ................. 382/104
2002/0093666 A1 7/2002 Foote et al.

FOREIGN PATENT DOCUMENTS

| | | | |
|---|---|---|---|
| DE | 40 03 983 C1 | | 8/1991 |
| DE | 199 08 167 A1 | | 8/2000 |
| DE | 100 62 977 A1 | | 6/2002 |
| WO | WO 99/04378 | * | 1/1999 |
| WO | WO 00/38949 | | 7/2000 |

* cited by examiner

*Primary Examiner*—Seyed Azarian
(74) *Attorney, Agent, or Firm*—Crowell & Moring LLP

(57) ABSTRACT

The invention relates to a method for generating a computed digital image of a scene, which can be illuminated with different luminous intensities at a first illumination angle by a first light source. An image sensor records a number of individual images of the scene under different lighting conditions, and these images are set against one another in a pixel-by-pixel manner in a data processing device in order to generate a resulting image. The invention is characterized in that at least one additional light source is provided by means of which the scene can be illuminated at an illumination angle that is different from the illumination angle of the first light source. The different lighting conditions when recording the individual images are obtained by various combinations of luminous intensities of the first and of the at least one other additional light source. The invention also relates to a device for carrying out the inventive method.

19 Claims, 1 Drawing Sheet

8
3
4
11
9
10
B
C
D
A
7

METHOD AND DEVICE FOR COMPENSATING FOR SHADOWS IN DIGITAL IMAGES

CROSS REFERENCE TO RELATED APPLICATIONS

This application is a continuation of International Patent Application No. PCT/EP2003/010224, filed Sep. 12, 2003, designating the United States of America, and published in German as WO 2004/040515 A1, the entire disclosure of which is incorporated herein by reference. Priority is claimed based on German Patent Application No. 102 50 705.8, filed Oct. 31, 2002.

BACKGROUND AND SUMMARY OF THE INVENTION

The invention relates to a method of producing a computed digital image of a scene, which can be illuminated with different luminous intensities at a first illumination angle by a first light source. A plurality of individual images of the scene under different lighting conditions are taken by an image sensor and are offset against one another in a pixel-by-pixel manner in a data processing device for generating a resultant image.

The invention also relates to a device for producing a computed digital image, including a first light source, by which a scene to be recorded can be illuminated at a first illumination angle with different luminous intensities; an image sensor for the imaging detection of the illuminated scene and the output of digital individual images of the scene consisting of a plurality of pixels; control devices for the coordinated controlling of the light source and of the image sensor, so that individual images of the scene can be recorded under different lighting conditions; and a data processing device for the pixel-by-pixel offsetting of at least some of the individual images against one another.

Such methods and devices are known, for example, from applications for the image-supported monitoring or control of many different processes, in which an automatic analysis of a scene is desired and for whose simplification an image preprocessing is carried out which has the purpose of eliminating certain disturbance effects.

From German Patent document DE 100 62 977 A1, for example, a method and a device are known for monitoring the interior of a motor vehicle, in which case an infrared (IR)-sensitive CMOS digital camera takes individual images of the scene, specifically of the vehicle interior. Further, an IR radiation source for illuminating the scene is provided in the motor vehicle interior. For producing a result image, two individual images, respectively, are taken in rapid chronological succession. During the taking of the first individual image, the scene is illuminated by the IR radiation source at full power. During the talking of the second individual image, the scene is illuminated by the IR radiation source at a reduced power or, in an extreme case, is not illuminated at all. For producing the result image, the two individual images are then subtracted from one another pixel-by-pixel, so that the pixel values of the result image are corrected by the fraction of the background radiation, the so-called offset, which is independent of the IR radiation source.

As an object of monitoring the interior of a motor vehicle, a protection against an unauthorized access is known, for example, from the above-mentioned document. As another object, the monitoring of the positions of persons situated in the vehicle is known, for example, from German Patent document DE 199 08 167 A1. This dynamic type of monitoring is used, for example, for controlling passive safety systems, such as air bags. Particularly in the case of this type of monitoring systems, it is important that the objects of the scene which are of interest, such as the persons whose positions are to be detected, can be reliably distinguished from their own shadow or shadows which are cast by other objects of the scene. This task, which is simple for the human brain, presents considerable difficulties to automated systems which require extensive and therefore very time-intensive computing expenditures. Specifically, the time factor is extremely critical in the case of dynamic systems, and particularly passive seat belt systems.

It is therefore an object of the present invention to further develop a method of the above-mentioned type such that shadow effects of scene objects can be compensated in a simple manner.

It is another object of the present invention to further develop a device of the above-mentioned type such that it is suitable for implementing the method according to the invention.

The former object is achieved by providing a method of producing a computed digital image of a scene which can be illuminated with different luminous intensities at a first illumination angle by a first light source, a plurality of individual images of the scene under different lighting conditions being taken by an image sensor and being offset against one another in a pixel-by-pixel manner in a data processing device for generating a result image. At least another light source is provided by which the scene can be illuminated at an illumination angle with different luminous intensities which differs from the illumination angle of the first light source. In this case, the different illumination conditions when taking the individual images are achieved by different combinations of the luminous intensities of the first and of at least one other light source.

The effect of this method according to the invention consists of the fact that individual images of the same scene objects are produced but that the different illumination conditions provide that, during each taking of an individual image, the objects cast differently oriented shadows, so that in each individual image the values of different pixels are influenced by the casting of the shadow. It is thereby made possible that, within the scope of the subsequent offsetting of the individual images with one another, the influence of the casting of the shadow is compensated and an essentially shadow-free result image is obtained.

For simplifying the further description, the following definition is introduced. The value lj(n) in a pixel n in an individual image j can be represented in a simplified manner as $$I_j(n)=\alpha\cdot\rho(n)\cdot E(n) \quad (1)$$

wherein p(n) is the surface reflectance of the scene point imaged in the pixel n; E(n) is the irradiation intensity fed to this scene point, and $\alpha$ is a proportional factor which describes influences, such as the light intensity of the used detector lens system, the efficiency of the detector and others and which, for reasons of simplicity, without limiting the generality, is assumed here to be equal to one ($\alpha$=1) for all pixels.

It is true that different image processing methods are contemplated, in the case of which the pixels of the individual images influenced by the casting of shadows can be identified as such and their values during the production of the result image can be corrected for compensating the shadow effect. However, it is particularly advantageous for the offsetting of the individual images with one another to take place such that, while all pixel positions are treated the same, two pixels respectively of the result image, on which scene points illuminated by at least one light source are imaged, which are illuminated directly by different light sources or different numbers of light sources, have essentially the same pixel value with the exception of a factor representing the reflectance of the respective scene point.

As a result of the equal treatment of all pixel positions, that is, the application of the same mathematical operations to the entire image, time-consuming operations in the image itself, such as algorithms for detecting contours or the like, can be avoided. Such methods may be required, for example, within the scope of a subsequent analysis of the scene. However, for reasons of time, it is better to avoid them during the preparatory production of an initial image for the analysis, thus of the result image of the method according to the invention described here. As a result of the equal treatment of all their respective pixels, the individual images and possibly intermediate images computed therefrom in their entirety may be considered as variables of mathematical operations which can be applied, for example, by special image processing processors to all or at least a portion of the pixels in parallel. A significant time advantage can be achieved thereby in comparison to interpreting methods which have the actual image content as their object.

The operations to be applied to the images are to be selected such that each value of a pixel n of the result image essentially represents the reflectance p(n) of the surface of the scene point imaged in the pixel n. This means that scene areas, which are influenced by shadow effects, that is, are not directly illuminated by all light sources, by means of the image processing according to the invention, are adapted to one another and with respect to shadow-free scene areas. In other words, an ideal shadow-free illumination of the scene is simulated. Scene areas which are not illuminated by any light source, thus, can supply no relevant information, should preferably be ignored in this case, or should be set to a value which marks it as being ignorable during a subsequent further image processing. This marking should also preferably take place while all pixels are treated equally. In this context, “essentially” means that variations which are based on differences of the luminous intensity based on other reasons, for example, differences relating to the distance of the scene points from the light sources and/or the image sensor, are not taken into account.

Basically, a large number of suitable control modes of image taking and illumination are contemplated. However, a method was found to be particularly advantageous which is distinguished in that three individual images are taken for computing a result image, in which case two light sources are controlled such that, when a first individual image is taken, the first light source illuminates the scene with a first luminous intensity and the second light source illuminates the scene with a second luminous intensity differing from the first; during the taking of a second individual image, the first light source illuminates the scene with the second luminous intensity and the second light source illuminates the scene with the first luminous intensity; and, during the taking of a third individual image, both light sources each illuminate the scene with the second luminous intensity. As a result, the offsetting of the individual images with respect to one another becomes very easy. On the one hand, only a small number of individual images, specifically three, is required. On the other hand, as a result of the exchange according to the invention of the luminous intensities between the two light sources in the first and in the second individual image, essentially symmetrical illumination patterns are produced which facilitate the further processing of the data.

It is advantageous to preferably use such operations when offsetting the individual images with respect to one another, which can be implemented at low computing expenditures and do not lead to an excessive increase of the pixel noise. Thus, in particular, divisions by noise-loaded values should be avoided, if possible. On the other hand, it was found to be advantageous for the offsetting of the individual images with respect to one another to comprise the computing of the pixel-by-pixel difference and/or sum of the first and of the second individual image and/or the sum from the amount of the difference and of the sum of the first and of the second individual image. In addition, it was found to be advantageous to carry out a pixel-by-pixel subtraction of the third individual image.

An embodiment of the method according to the invention is particularly preferred in which, for computing the result image, a combination of mathematical operations is used which can be written according to the following formula $$I_{out}=|I_1-I_2|+(I_1+I_2)-2\cdot I_3 \quad (2)$$

wherein Iout is the value of a pixel of the result image; I1 is the value of the corresponding pixel of the first individual image; I2 is the value of the corresponding pixel of the second individual image; and I3 is the value of the corresponding pixel of the third individual image. Naturally, this formula is symbolic and is to be understood in such a manner that additive correction terms or correction factors which do not significantly change the image-related effect of the operation according to Equation (2) are also detected.

The above-mentioned second object is achieved by providing a device for producing a computed digital image, including a first light source by which a scene to be taken can be illuminated at a first illumination angle with different luminous intensities, an image sensor for imaging detection of the illuminated scene and the output of digital images of the scene consisting of a plurality of pixels, control devices for the coordinated controlling of the light source and of the image sensor, so that individual images of the scene can be taken under different illumination conditions, a data processing device for the pixel-by-pixel offsetting of at least some of the individual images with one another. At least one additional light source is provided by which the scene can be illuminated at a second illumination angle with different luminous intensities which differs from the first illumination angle. The light sources can be controlled such by the control devices such that the different illumination conditions during the taking of the individual images can be achieved by different combinations of the luminous intensities of the first and of at least one additional light source. This is the basic device-related prerequisite for being able to implement the above-described method. The prerequisite for implementing the above-described method also in the above-described preferred embodiments is the correspondingly suitable setting-up of the control devices as well as of the data processing system. The advantages achieved by the fact that the preferably program-related setting-up of the control devices and of the data processing system permits the implementation of the method according to the invention are illustrated by the above-described advantages of the method itself.

Although the method according to the invention is basically suitable for all types of illumination radiation, such as electromagnetic radiation in the optical, UV, IR, x-ray, microwave and radio wave range or acoustic radiation in arbitrary frequency ranges, particularly in the ultrasound range, the application in the close IR region was found to be particularly reliable and cost-effective. Particularly for applications in the environment of persons, this frequency range is particularly suitable because of its invisibility to the human eye, its relative harmlessness in the case of intensities which can be handled and its simultaneously still good spatial resolution because of the still short wavelengths.

A particularly advantageous field of application of the method according to the invention and of the device according to the invention is the monitoring of an interior of a motor vehicle; be it, for example, for the theft protection or for the detection of occupant positions, for example, for controlling passive safety systems.

As mentioned above, the above explanations neglect the influence of the distance of the scene points from the light sources. This is justified in many cases, particularly when no distance between a scene point and a light source is small in comparison to a distance between two scene points. In other words, that the light sources are arranged to be essentially at an equal distance from all scene points. In this case, the approximation implicitly made above that the luminous intensity E(n) for all directly illuminated scene points depends in the same manner on the radiation intensity of the respective light sources is correct. In addition, it is sufficient for many applications that, although the shadow effects are not completely compensated, they are significantly reduced.

Other objects, advantages and novel features of the present invention will become apparent from the following detailed description of the invention when considered in conjunction with the accompanying drawings.

DETAILED DESCRIPTION OF THE DRAWINGS

Figure 1:
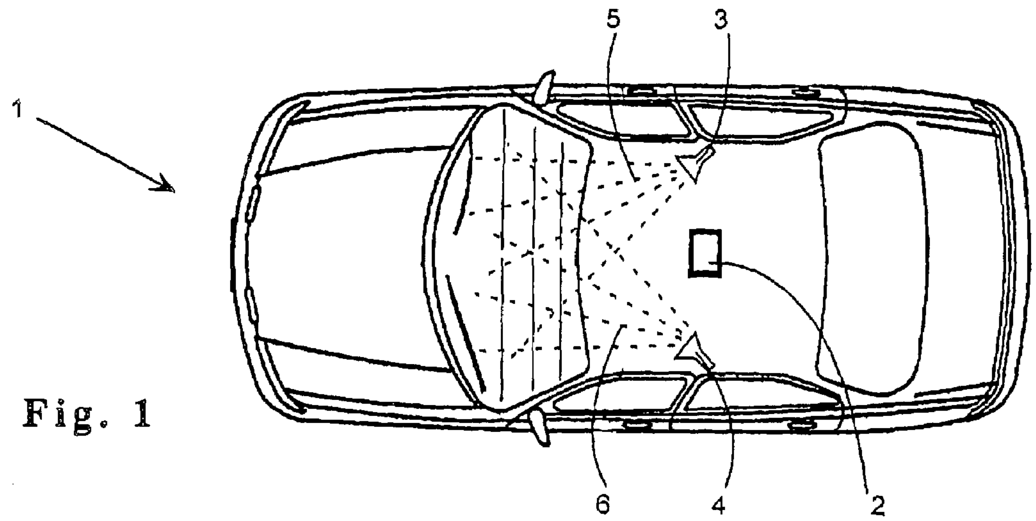
FIG. 1 is a schematic representation of a motor vehicle with a monitoring of the interior according to the invention.

FIG. 1 is a top view of a motor vehicle 1, in which an image sensor 2 is arranged in central position on the roof ceiling, which image sensor 2 at least partially detects the interior of the vehicle 1 in the close IR spectral region and in a known manner produces digital images thereof. The image sensor 2 is controlled by control devices which are not shown and supplies its image data to an also not shown data processing system. Both devices can be integrated, for example, in an on-board computer which, as a rule, is present anyhow in modem vehicles. Naturally, the utilization of independent specialized units is also contemplated.

One light-emitting diode 3, 4 respectively or a group of light-emitting diodes are arranged in the area of the B-columns of the vehicle and emit light 5, 6 in the close IR region into the interior of the vehicle. Like the image sensor 2, which detects the illumination light of the diodes reflected by the scene, the light-emitting diodes are controlled by the control devices, which are not shown, with respect to their luminous intensity and their illumination time.

Figure 2:
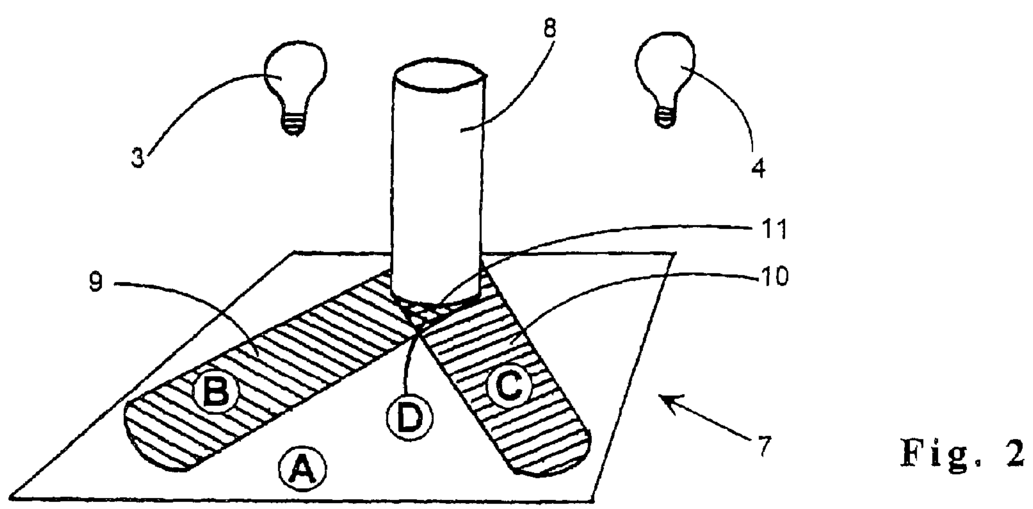
FIG. 2 is a schematic representation of different shadow effects within the scope of the application of the method according to the invention.

FIG. 2 is a schematic view of a scene 7 with a scene object 8 which shades certain scene areas 9, 10, 11 against the illumination by one or both of the light sources 3 and 4. For making it easier to understand the following computations used as examples, the areas of the scene 7, which differ as a result of their shadow characteristic, are additionally marked by capital letters which are also used in FIG. 3. A indicates areas which are directly illuminated by both light sources 3 and 4. B indicates areas which are directly illuminated only by the first light source 3; and C indicates those areas which are directly illuminated only by the second light source 4. D indicates areas which are situated in the core shadow of the scene object 8 and are not directly illuminated by any of the light sources 3, 4.

Figure 3:
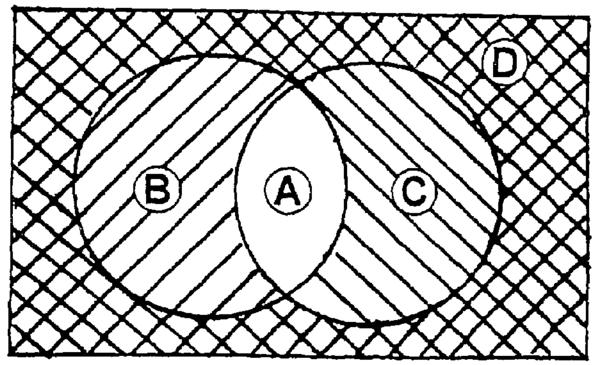
FIG. 3 is a diagram for illustrating different illumination areas of a scene.

FIG. 3 is a diagram of two mutually overlapping quantity circles, which can each be understood as a quantity of illuminated scene points, the designation of the quantities taking place according to the above-mentioned explanation.

In the following, the individual steps of a particularly advantageous embodiment of the method according to the invention will be explained in detail.

For talking a first individual image, the scene 7 is illuminated by a first light source 3 with the luminous intensity E1 and by the second light source 4 with the luminous intensity E2<E1. It is further assumed that the entire scene is additionally illuminated by a diffuse background radiation E0 independent of the light sources 3, 4, which is the same for all scene points. The following equation (1) will then be obtained:

A: For pixels on which a scene point from scene area A is imaged $$I_1=\rho\cdot(E_1+E_2+E_0), \quad \text{(A1)}$$

B: for pixels on which a scene point from scene area B is imaged $$I_1=\rho\cdot(E_1+E_0), \quad \text{(B1)}$$

C: for pixels on which a scene point from scene area C is imaged $$I_1=\rho\cdot(E_2+E_0), \quad \text{(C1)}$$

D: for pixels on which a scene point from scene area D is imaged $$I_1=\rho\cdot E_0, \quad \text{(D1)}$$

For taking a second individual image, in the preferred embodiment, the illumination conditions are symmetrically exchanged; that is, scene 7 is illuminated by the first light source 3 with the luminous intensity E2 and by the second light source 4 with the luminous intensity E1. The following equation (1) will then be obtained:

A: For pixels on which a scene point from scene area A is imaged $$I_2=\rho\cdot(E_1+E_2+E_0), \quad \text{(A2)}$$

B: for pixels on which a scene point from scene area B is imaged $$I_2=\rho\cdot(E_2+E_0), \quad \text{(B2)}$$

C: for pixels on which a scene point from scene area C is imaged $$I_2=\rho\cdot(E_1+E_0), \quad \text{(C2)}$$

D: for pixels on which a scene point from scene area D is imaged $$I_2=\rho\cdot E_0, \quad \text{(D2)}$$

For taking a third individual image, the scene 7 is illuminated by both light sources 3, 4 with the luminous intensity E2. Thus, the following Equation (1) will be obtained:

A: For pixels on which a scene point from scene area A is imaged $$I_3=\rho\cdot(2\cdot E_2+E_0), \quad (A3)$$

B: for pixels on which a scene point from scene area B is imaged $$I_3=\rho\cdot(E_2+E_0), \quad (B3)$$

C: for pixels on which a scene point from scene area C is imaged $$I_3=\rho\cdot(E_2+E_0), \quad (C3)$$

D: for pixels on which a scene point from scene area D is imaged $$I_3=\rho\cdot E_0, \quad (D3)$$

According to a preferred embodiment, these three individual images are subjected to a pixel-by-pixel mathematical operation according to Equation (2). In this case, in two intermediate steps, two intermediate images I4, I5 can be produced. The first intermediate image I4 represents the amount of the pixel-by-pixel difference of the first two individual images I1, I2.

$$I_4=|I_1-I_2|, \quad (3)$$

The pixel values then receive the following form in the different illumination areas.

A: For pixels on which a scene point from scene area A is imaged $$I_4=0, \quad (A4)$$

B: for pixels on which a scene point from scene area B is imaged $$I_4=\rho\cdot(E_1-E_2), \quad (B4)$$

C: for pixels on which a scene point from scene area C is imaged $$I_4=\rho\cdot(E_1-E_2), \quad (C4)$$

D: for pixels on which a scene point from scene area D is imaged $$I_4=0, \quad (D4)$$

The second intermediate image I5 represents the pixel-by-pixel sum of the first two individual images I1, I2.

$$I_5=I_1+I_2, \quad (4)$$

The pixel values in the different illumination areas then receive the following form.

A: For pixels on which a scene point from scene area A is imaged $$I_5=2\cdot\rho\cdot(E_1+E_2+E_0), \quad (A5)$$

B: for pixels on which a scene point from scene area B is imaged $$I_5=\rho\cdot(E_1+E_2+2\cdot E_0), \quad (B5)$$

C: for pixels on which a scene point from scene area C is imaged $$I_5=\rho\cdot(E_1+E_2+2\cdot E_0), \quad (C5)$$

D: for pixels on which a scene point from scene area D is imaged $$I_5=2\cdot E_0, \quad (D5)$$

Finally, the result image Iout, which is obtained according to Equation (2), can be described as follows by using the two intermediate images I4, I5

$$I_{out}=I_4+I_5-2\cdot I_3, \quad (5)$$

The pixel values in the different illumination areas will then receive the following form.

A: For pixels on which a scene point from scene area A is imaged $$I_{out}=2\cdot\rho\cdot(E_1-E_2), \quad (A6)$$

B: for pixels on which a scene point from scene area B is imaged $$I_{out}=2\cdot\rho\cdot(E_1-E_2), \quad (B6)$$

C: for pixels on which a scene point from scene area C is imaged $$I_{out}=2\cdot\rho\cdot(E_1-E_2), \quad (C6)$$

D: for pixels on which a scene point from scene area D is imaged $$I_{out}=0, \quad (D6)$$

This result means that, in the result image, in all image areas representing scene areas which are directly illuminated by a least one light source 3, 4, the shadow effects are compensated and the pixel values differ essentially only by the reflectance value of the scene point, thus the information that is actually of interest. Figuratively speaking, this means that, by means of the method according to the invention, an ideal shadow-free light source of the luminous intensity 2*(E1–E2) can be simulated. Only those scene areas which are not directly illuminated by any light source are essentially set to zero. This corresponds to an offset correction of the image, and leads to a rejection of pixels carrying no relevant information.

Naturally, the detailed description of the preferred embodiment should be understood only as an example. A person skilled in the art will also recognize that the use of correction factors or terms, which reflect, for example, special geometrical conditions, to not affect the core of the present invention.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof

What is claimed is:

1. A method of producing a computed digital image of a scene which can be illuminated with different luminous intensities at a first illumination angle by a first light source, a plurality of individual images of the scene under different lighting conditions being taken by an image sensor and being offset against one another in a pixel-by-pixel manner in a data processing device for generating a result image, the method comprising the acts of:

illuminating the scene with at least one other light source at an illumination angle with different luminous intensities which differ from the illumination angle of the first light source; and achieving the different illumination conditions during the taking of individual images by different combinations of the luminous intensities of the first and of the at least one other light source, the computed digital image being generated by taking three individual images, each with different luminous intensities of the first and at least one other light sources.

2. The method according to claim 1, wherein offsetting of the individual images with one another takes place such that two pixels respectively of the result image on which scene points are imaged which are illuminated by at least one light source and which are directly illuminated by different light sources or different numbers of light sources, with the exception of a factor representing the reflectance of the respective scene point, have essentially the same pixel value.

3. A device for producing a computed digital image, comprising:

a first light source by which a scene to be taken can be illuminated at a first illumination angle with different luminous intensities;

an image sensor for the imaging detection of the illuminated scene and the output of digital images of the scene comprising a plurality of pixels;

control devices for the coordinated controlling of the light source and of the image sensor, so that individual images of the scene can be taken under different illumination conditions;

a data processing device for the pixel-by-pixel offsetting of at least some of the individual images with one another, and generating the computed digital image by taking three individual images, each with different intensities of the first and the at least one other light sources; and at least one other light source by which the scene can be illuminated at a second illumination angle which differs from the first with different luminous intensities, wherein the light sources are controllable by the control devices such that the different illumination conditions during the taking of the individual images can be achieved by different combinations of the luminous intensities of the first and of the at least one other light source, wherein the control devices and the data processing system are structured to implement a method according to claim 2.

4. The method according to claim 1, wherein the result image is subjected to another image processing whose result is used for an automated decision finding within the scope of the monitoring of an interior of a motor vehicle.

5. A method of producing a computed digital image of a scene which can be illuminated with different luminous intensities at a first illumination angle by a first light source, a plurality of individual images of the scene under different lighting conditions being taken by an image sensor and being offset against one another in a pixel-by-pixel manner in a data processing device for generating a result image, the method comprising the acts of:

illuminating the scene with at least one other light source at an illumination angle with different luminous intensities which differ from the illumination angle of the first light source;

achieving the different illumination conditions during the taking of individual images by different combinations of the luminous intensities of the first and of the at least one other light source;

computing the result image by taking three individual images, two light sources being controlled such that:

during the taking of a first individual image, the first light source illuminates the scene with a first luminous intensity and the second light source illuminates the scene with a second luminous intensity which differs from the first;

during the taking of a second individual image, the first light source illuminates the scene with the second luminous intensity and the second light source illuminates the scene with the first luminous intensity; and during the taking of a third individual image, both light sources each illuminate the scene with the second luminous intensity.

6. The method according to claim 5, wherein the offsetting of the individual images with one another comprises the computing of the pixel-by-pixel difference of the first and of the second individual image.

7. The method according to claim 5, wherein the offsetting of the individual images with one another further comprises the computing of the pixel-by-pixel sum of the first and of the second individual image.

8. The method according to claim 7, wherein the offsetting of the individual images with one another comprises the computing of the pixel-by-pixel sum from the amount of the difference and of the sum of the first and of the second individual image.

9. The method according to claim 6, wherein the offsetting of the individual images with one another comprises the computing of the pixel-by-pixel sum from the amount of the difference and of the sum of the first and of the second individual image.

10. The method according to claim 5, wherein the offsetting of the individual images with one another comprises the computing of the pixel-by-pixel sum of the first and of the second individual image.

11. The method according to claim 5, wherein the offsetting of the individual images with one another comprises the computing of the pixel-by-pixel sum from the amount of the difference and of the sum of the first and of the second individual image.

12. The method according to claim 5, wherein the offsetting of the individual images with one another comprises the pixel-by-pixel subtraction of the third individual image.

13. The method according to claim 5, wherein the pixel values of the result image can essentially be represented as follows $$I_{out}=|I_1-I_2|+(I_1+I_2)-2\cdot I_3,$$

wherein $I_{out}$ is the value of a pixel of the result image, $I_1$ is the value of the corresponding pixel of the first individual image, $I_2$ is the value of the corresponding pixel of the second individual image, and $I_3$ is the value of the corresponding pixel of the third individual image.

14. A method of producing a computed digital image of a scene which can be illuminated with different luminous intensities at a first illumination angle by a first light source, a plurality of individual images of the scene under different lighting conditions being taken by an image sensor and being offset against one another in a pixel-by-pixel manner in a data processing device for generating a result image, the method comprising the acts of:

illuminating the scene with at least one other light source at an illumination angle with different luminous intensities which differ from the illumination angle of the first light source;

achieving the different illumination conditions during the taking of individual images by different combinations of the luminous intensities of the first and of the at least one other light source;

offsetting of the individual images with one another such that two pixels respectively of the result image on which scene points are imaged which are illuminated by at least one light source and which are directly illuminated by different light sources or different numbers of light sources, with the exception of a factor representing the reflectance of the respective scene point, have essentially the same pixel value;

computing the result image by taking three individual images, two light sources being controlled such that:

during the taking of a first individual image, the first light source illuminates the scene with a first luminous intensity and the second light source illuminates the scene with a second luminous intensity which differs from the first;

during the taking of a second individual image, the first light source illuminates the scene with the second luminous intensity and the second light source illuminates the scene with the first luminous intensity; and during the taking of a third individual image, both light sources each illuminate the scene with the second luminous intensity.

15. A device for producing a computed digital image, comprising a first light source by which a scene to be taken can be illuminated at a first illumination angle with different luminous intensities, an image sensor for the imaging detection of the illuminated scene and the output of digital images of the scene comprising a plurality of pixels, control devices for the coordinated controlling of the light source and of the image sensor, so that individual images of the scene can be taken under different illumination conditions, a data processing device for the pixel-by-pixel offsetting of at least some of the individual images with one another and generating the computed digital image by taking three individual images, each with different intensities of the first and the at least one other light sources; and at least one other light source by which the scene can be illuminated at a second illumination angle which differs from the first with different luminous intensities, wherein the light sources are controllable by the control devices such that the different illumination conditions during the taking of the individual images can be achieved by different combinations of the luminous intensities of the first and of the at least one other light source.

16. The device according to claim 15, wherein the device is integrated as part of a monitoring system in an interior of a motor vehicle.

17. The device according to claim 15, wherein the light sources emit light in the close infrared region.

18. The device according to claim 15, wherein the light sources are arranged relative to one another and relative to the scene detected by the image sensor such that no distance between a scene point and a light source is small in comparison to a distance between two scene points.

19. A method for generating a computed digital image of scene, the method comprising the acts of:

controlling a first and a second light source operable to illuminate the scene with different luminous intensities at different illumination angles;

taking a first individual image, wherein the first light source illuminates the scene with a first luminous intensity and the second light source illuminates the scene with a second luminous intensity differing from the first;

taking a second individual image wherein the first light source illuminates the scene with the second luminous intensity and the second light source illuminates the scene with the first luminous intensity; and taking a third individual image wherein both light sources each illuminate the scene with the second luminous intensity; and computing a result image based on the three individual images taken.

* * * * *